May 29, 1923.
Re. 15,614
J. H. BRIMSON
VARIABLE SPEED DEVICE
Original Filed Nov. 10, 1916
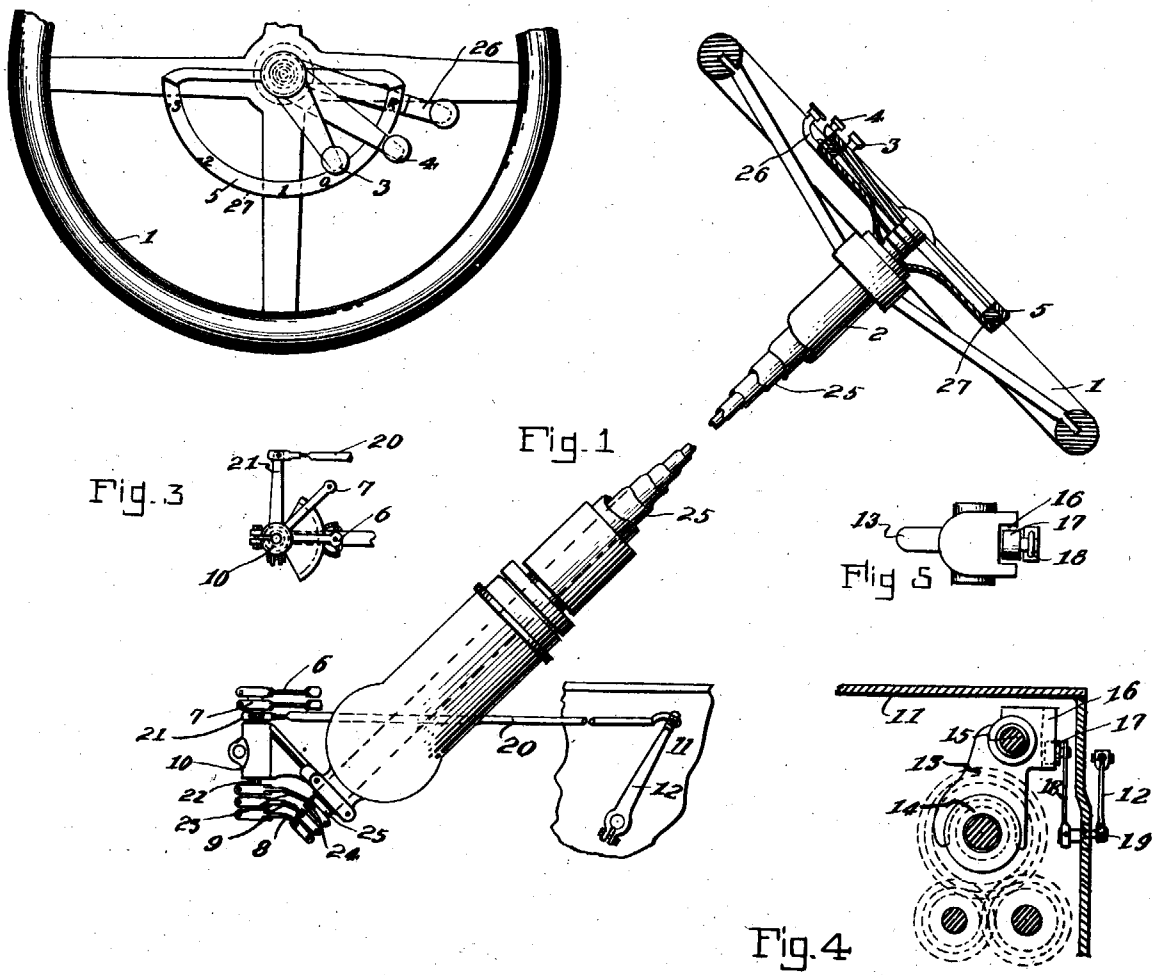
Inventor
JAMES H. BRIMSON,
By
Attorneys Reissued May 29, 1923. Re. 15,614

UNITED STATES PATENT OFFICE.

JAMES H. BRIMSON, OF SAGINAW, MICHIGAN, ASSIGNOR, BY DIRECT AND MESNE ASSIGNMENTS, TO BRIMSON TRANSMISSION COMPANY, OF SAGINAW, MICHIGAN, A CORPORATION OF MICHIGAN.

VARIABLE-SPEED DEVICE.

Original No. 1,232,889, dated July 10, 1917, Serial No. 130,680, filed November 10, 1916. Application for reissue filed March 5, 1920. Serial No. 363,555.

*To all whom it may concern:*

Be it known that I, JAMES H. BRIMSON, a citizen of the United States of America, residing at Saginaw, in the county of Saginaw and State of Michigan, have invented certain new and useful Improvements in Variable-Speed Devices, of which the following is a specification, reference being had therein to the accompanying drawings.

This invention relates to means for quickly and easily shifting the change-speed mechanism of automobiles and similar vehicles, and it has for its objects—first, to provide devices that can be readily adapted to existing forms of tubular columns and to existing types of steering wheels, whereby the driver of an automobile is enabled to easily and quickly change the speed of the vehicle by shifting the speed mechanism without either removing his eyes from the road ahead, or removing his hands from their usual position on the steering wheel, and without exerting any considerable muscular force; second to provide a new arrangement of connections for effecting the quick and easy operation of the change-speed mechanism, and to do this by devices having superior convenience, and compactness and without adding any parts or appliances to the exterior of the steering column; third, to provide hand-actuated means located within convenient reach of the operator's fingers (while his hands are in their usual position on the steering wheel) whereby variable speed mechanism of the type described in my Patent No. 1,101,681, issued June 30, 1914, may be quickly and easily actuated to change the speed of the vehicle.

With the above and certain other objects in view, which will appear later in the specification, my invention comprises the devices described and claimed and the equivalents thereof.

In the drawings,

Figure 1 is a side elevation, broken away in part, showing my improved mechanism as applied to a tubular steering column of usual construction;

Fig. 2 is a top plan view of the steering wheel;

Fig. 3 is a side elevation of the lower bearings shown in Fig. 1;

Fig. 4 is a sectional view showing a preferred form of device for actuating the mechanism within the gear case;

Fig. 5 is a fragmentary detail showing the connection between the gears and the levers that control them.

As clearly shown in the drawings, the device consists in a steering wheel 1 of usual construction, mounted in the ordinary way on the steering column 2. 3 is the usual spark control lever and 4 is the throttle control lever, both of these levers operating on the quadrant 5, in accordance with established practice.

6 is the spark-arm operated by the spark control lever and 7 is the throttle arm operated by the throttle control lever.

8 indicates the gears that connect the spark arm with its lever and 9 are the throttle gears that connect the arm 7 with its control lever 4.

As is well known, it is customary to mount the respective gears on tubular shafts, one within the other and all supported by a suitable bearing 10, which is immovably fixed to the steering column.

The above enumerated devices are all of well-known construction and arrangement, and it is to these devices that my present improvement is adapted to be added.

11 represents the casing of a variable-speed mechanism and 12 is an arm located exterior to the casing 11, and adapted when oscillated to put the various gears within the casing into and out of operation and thereby change the speed, or reverse the movement of the vehicle.

Any suitable mechanism may be employed to properly connect the arm 12 to the gears, but I prefer to employ the devices shown in Figs. 4 and 5, where 13 is a fork adapted to shift the key-operating collar 14 described in my patent above mentioned. The arm 13 is slidably mounted on shaft 15, which is carried by the casing, and one face of the arm is preferably provided with a vertical groove 16. In this groove a roller 17 travels. This roller is mounted on the end of an arm 18 fixed to a rock shaft 19 that projects through the casing and carries at its outer end the arm 12 above referred to. Oscillating the arm 12 moves the arm 13 and thereby changes the speed from first to second or third, or to reverse, as fully explained in the patent above referred to.

A link 20 connects the outer end of arm 12 to the upper end of the speed lever crank arm 21, which is in turn connected by means of a tubular shaft 22, in the bearing 10, to a gear 23. This gear meshes with pinion 24, secured to the lower end of the gear shift tube 25, which tube extends through the column, and at its upper end carries the speed control lever 26. This speed control lever, as is clearly shown in the drawings, is located above the hub of the wheel 1 and is preferably below the planes of movement of the spark control lever 3 and of the throttle control lever 4. The lever 26 is preferably adapted to travel around the quadrant 27, which is preferably located below the quadrant of the control levers 3 and 4, so that the oscillatory movement of control lever 26 does not interfere with the setting of the control levers for the throttle and spark.

The operation of the speed control lever 26, through its tube 25, pinion 24 and gear 23 and crank arm 21, is similar to the operation of the throttle control and spark control levers through their respective tubes and gears. In the present improvement, however, I have adapted the principle of the ordinary throttle and spark control to a new purpose by adding to the control mechanism on the steering wheel a simple, efficient and practical speed control device, by which the driver of the car is enabled to easily and quickly shift the transmission mechanism to produce slow, intermediate, or high speed, or reverse, without either removing his hands from the steering wheel or taking his eyes from the road ahead.

My improvement, while capable of being adapted to transmissions having sliding gears, is particularly well adapted for use in conjunction with variable speed mechanisms of the type described and in my former Patent No. 1,101,681, because the gear shifting mechanism therein shown is especially adapted to be shifted without the expenditure of any appreciable amount of muscular force. The gears of that mechanism being always in mesh, the only force required is a force sufficient to move the interlocking keys. It has been found in actual installations of the device herein described that the speed control lever 26 can be shifted from the position R, (Fig. 2) to O, which is the neutral position, and to 1, 2 or 3, which are the respective speed positions by the pressure of one finger, and that the shifting of the keys through these different positions can be accomplished without any appreciable shock or jar and with no strain being brought upon the steering column or upon the tubes which are contained in it.

It will be noted that the installing of this device on an existing steering post does not necessitate the use of any parts that project from the side of the steering column and that no transverse or bending strains are brought upon the column.

What I claim is:

In a motor vehicle having a change speed mechanism provided with an actuating arm, and a steering column assembly including a spark control and a throttle control:—an additional control carried by the steering column assembly for the actuating arm of the change speed mechanism, said additional control including a tubular shaft rotatably mounted within the steering column assembly and adapted to be rotated at the upper end of the steering column assembly, a rock shaft wholly outside of the steering column assembly at the lower end thereof, a crank on said shaft connected to the actuating arm of the change speed mechanism and adapted to actuate said change speed mechanism, and an operative connection between said rock shaft and said tubular shaft so that said rock shaft may be rocked by rotation of said tubular shaft.

In testimony whereof I affix my signature in the presence of two witnesses.

JAMES H. BRIMSON.

Witnesses:

NELLIE M. ANGUS,
G. B. WILLCOX.